United States Patent
Yukimasa et al.

(10) Patent No.: US 8,911,912 B2
(45) Date of Patent: Dec. 16, 2014

(54) FUEL CELL SYSTEM AND METHOD OF OPERATING FUEL CELL SYSTEM

(75) Inventors: Akinori Yukimasa, Osaka (JP); Shigeki Yasuda, Osaka (JP); Naohisa Tanabe, Kyoto (JP); Hidetoshi Wakamatsu, Shiga (JP)

(73) Assignee: Panasonic Corporation, Osaka (JP)

( * ) Notice: Subject to any disclaimer, the term of this patent is extended or adjusted under 35 U.S.C. 154(b) by 434 days.

(21) Appl. No.: 13/393,770

(22) PCT Filed: Mar. 17, 2011

(86) PCT No.: PCT/JP2011/001597
§ 371 (c)(1),
(2), (4) Date: Mar. 1, 2012

(87) PCT Pub. No.: WO2011/118169
PCT Pub. Date: Sep. 29, 2011

(65) Prior Publication Data
US 2012/0164546 A1 Jun. 28, 2012

(30) Foreign Application Priority Data
Mar. 24, 2010 (JP) ................. 2010-067587

(51) Int. Cl.
*H01M 8/06* (2006.01)
*H01M 8/04* (2006.01)

(52) U.S. Cl.
CPC ........ *H01M 8/04223* (2013.01); *H01M 8/0618* (2013.01); *H01M 8/04231* (2013.01); *H01M 8/0668* (2013.01); *Y02E 60/50* (2013.01); *H01M 8/04022* (2013.01); *H01M 8/04955* (2013.01); *H01M 8/0612* (2013.01)
USPC .......................................... 429/412; 429/423

(58) Field of Classification Search
CPC ..... H01M 8/00; H01M 8/008; H01M 8/0668; H01M 8/22; H01M 8/0618
USPC .................................................. 429/412, 423
See application file for complete search history.

(56) References Cited

U.S. PATENT DOCUMENTS

| | | |
|---|---|---|
| 2003/0104711 A1 | 6/2003 | Nakamura et al. |
| 2005/0019627 A1 | 1/2005 | Ozeki et al. |

(Continued)

FOREIGN PATENT DOCUMENTS

| | | |
|---|---|---|
| JP | 01-197970 | 8/1989 |
| JP | 02-260369 | 10/1990 |

(Continued)

OTHER PUBLICATIONS

International Search Report issued in International Patent Application No. PCT/JP2011/001597 dated May 31, 2011.
Chinese Office Action issued in Chinese Application No. 201180003691.5 dated Aug. 29, 2014, with English Translation.

*Primary Examiner* — Mark F Huff
*Assistant Examiner* — Rashid Alam
(74) *Attorney, Agent, or Firm* — McDermott Will & Emery LLP (57) ABSTRACT

A fuel cell system (100) includes: a hydrogen generator (2) including a reformer (3); a combustor (5) configured to supply heat to the reformer (3); a fuel cell (1); a first channel (10); a second channel (8); a third channel (16) through which an oxidation gas flows, the oxidation gas being supplied to the first channel (10) extending between a branch portion (10a) and the fuel cell (1); a first on-off valve (7a) provided on the first channel (10) located downstream of a meeting portion (10c); a second on-off valve (6) provided on the second channel (8); an oxidation gas supply unit (15) provided on the third channel (16); and a controller (200) configured such that when the first on-off valve (7a) is closed and the second on-off valve (6) is opened, and a hydrogen-containing gas is discharged from the hydrogen generator (2) at the time of start-up, the controller (200) activates the oxidation gas supply unit (15) to supply the oxidation gas through the third channel (16) to the first channel (10) located downstream of the branch portion (10c).

8 Claims, 8 Drawing Sheets

(56) References Cited

U.S. PATENT DOCUMENTS

| | | |
|---|---|---|
| 2005/0089732 A1* | 4/2005 | Aoyama et al. ............... 429/20 |
| 2007/0178337 A1 | 8/2007 | Nakamura et al. |
| 2009/0092883 A1 | 4/2009 | Ozeki et al. |
| 2009/0117426 A1* | 5/2009 | Harada et al. ............... 429/20 |

FOREIGN PATENT DOCUMENTS

| | | |
|---|---|---|
| JP | 2006-107908 | 4/2006 |
| JP | 2006-318714 | 11/2006 |
| JP | 2006-344408 | 12/2006 |
| JP | 2007-149544 | 6/2007 |

* cited by examiner

FUEL CELL SYSTEM AND METHOD OF OPERATING FUEL CELL SYSTEM

RELATED APPLICATIONS

This application is the U.S. National Phase under 35 U.S.C. §371 of International Application No. PCT/JP2011/001597, filed on Mar. 17, 2011, which in turn claims the benefit of Japanese Application No. 2010-067587, filed on Mar. 24, 2010, the disclosures of which Applications are incorporated by reference herein.

TECHNICAL FIELD

The present invention relates to a fuel cell system in which a small amount of oxidation gas is mixed in a hydrogen-containing gas supplied to a fuel cell, and a method of operating the fuel cell system.

BACKGROUND ART

Figure 8:
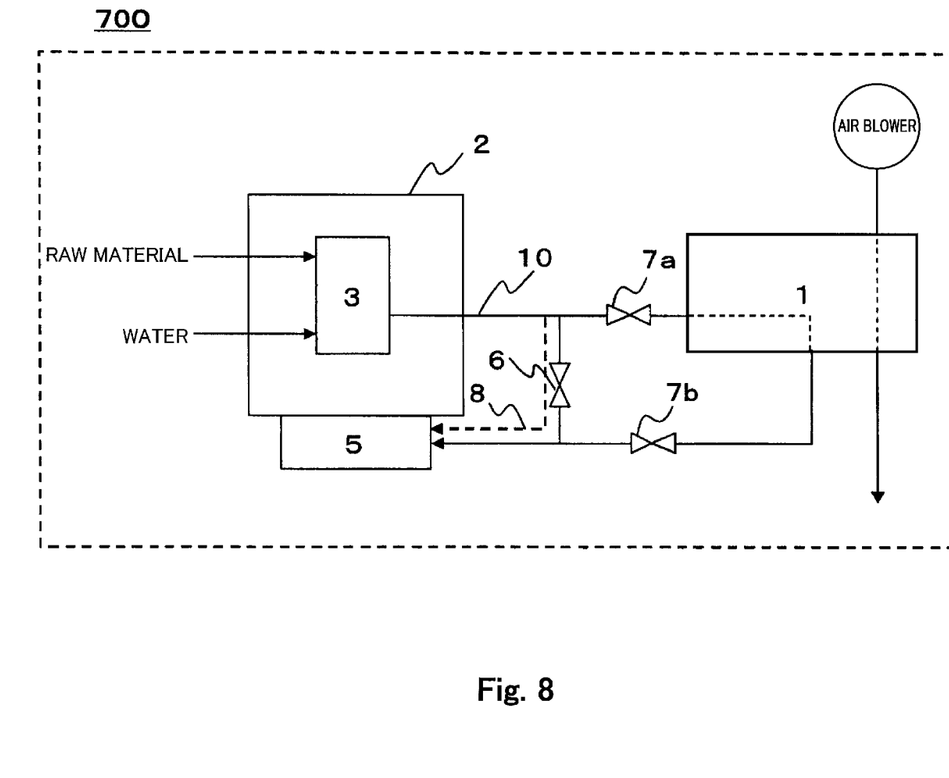
FIG. 8 is a schematic configuration diagram of a conventional fuel cell system.

FIG. 8 is a schematic configuration diagram of a conventional fuel cell system. As shown in FIG. 8, means for supplying a hydrogen-containing gas necessary in an electric power generating operation in a conventional fuel cell system 700 is not normally developed as an infrastructure. Therefore, a hydrogen generating device for generating the hydrogen-containing gas necessary in the electric power generating operation is provided.

The hydrogen generating device includes a hydrogen generator 2 including a reformer 3. By the progress of a reforming reaction in a reforming catalyst in the reformer 3, the hydrogen-containing gas is generated from steam and a raw material containing an organic compound containing at least carbon and hydrogen as constituent elements. At this time, the reforming catalyst included in the reformer 3 is heated by a combustor 5 provided adjacent to the reformer 3 to a temperature suitable for the progress of the reforming reaction. In the conventional fuel cell system 700, even if the hydrogen generating device starts generating the hydrogen-containing gas at the time of start-up, it does not supply the hydrogen-containing gas to a fuel cell 1 until the warm-up of the hydrogen generator 2 including the reformer 3 is completed and the composition of the hydrogen-containing gas stabilizes. During this time, a first on-off valve 7a is closed, and a second on-off valve 6 is opened. The hydrogen-containing gas discharged from the hydrogen generator 2 is supplied to the combustor 5 through a second channel 8 that is a bypass channel, and the combustor 5 uses the hydrogen-containing gas as a combustion fuel in a combustion operation (see PTL 1, for example).

CITATION LIST

Patent Literature

PTL 1: Japanese Laid-Open Patent Application Publication No. 2006-318714

SUMMARY OF INVENTION

Technical Problem

A fuel cell system described in PTL 1 is configured such that as described above, the hydrogen-containing gas supplied from the hydrogen generator 2 at the time of the start-up is not supplied to the fuel cell 1 but flows through the second channel 8. However, the hydrogen-containing gas gradually diffuses to a first channel 10 located downstream of a branch portion from which the second channel 8 branches. At this time, the first channel 10 located downstream of the branch portion is lower in temperature than the channels (the first channel 10 located upstream of the branch portion, the second channel 8, and the like) through which the hydrogen-containing gas has already been flowing. Therefore, there is a possibility that condensed water is generated from the diffusing hydrogen-containing gas and the channel is clogged. When the fuel cell system 700 shifts from the start-up to the electric power generating operation, the supply of the hydrogen-containing gas to the fuel cell starts. However, if such channel clogging occurs, there is a possibility that the supply of the hydrogen-containing gas to the fuel cell is inhibited, and this is not preferable.

In consideration of the above conventional problems, an object of the present invention is to provide a fuel cell system by which the possibility that the hydrogen-containing gas diffuses and flows into the first channel 10 located downstream of the branch portion at the time of the start-up and the channel clogging occurs by the generated condensed water is made smaller than before.

Solution to Problem

To solve the above problems, a fuel cell system of the present invention includes: a hydrogen generator including a reformer configured to generate a hydrogen-containing gas by a reforming reaction using a raw material and steam; a combustor configured to supply heat for the reforming reaction to the reformer; a fuel cell configured to generate electric power by using the hydrogen-containing gas supplied from the hydrogen generator; a first channel through which the hydrogen-containing gas discharged from the hydrogen generator and flowing through the fuel cell flows; a second channel which is configured to branch from the first channel and bypass the fuel cell and through which the hydrogen-containing gas supplied to the combustor flows; a third channel through which an oxidation gas flows, the oxidation gas being supplied to the first channel extending between the fuel cell and a branch portion from which the second channel branches; a first on-off valve provided on the first channel located downstream of a meeting portion where the first channel and the third channel meet; a second on-off valve provided on the second channel; an oxidation gas supply unit connected to the third channel; and a controller configured such that when the first on-off valve is closed and the second on-off valve is opened, and the hydrogen-containing gas is discharged from the hydrogen generator at the time of start-up, the controller activates the oxidation gas supply unit to supply oxygen through the third channel to the first channel.

A method of operating a fuel cell system of the present invention is a method of operating the fuel cell system and includes the steps of: (a) discharging a hydrogen-containing gas from a hydrogen generator at the time of start-up in a state where a first on-off valve is closed and a second on-off valve is opened, the hydrogen generator including a reformer configured to generate the hydrogen-containing gas by a reforming reaction using a raw material, the first on-off valve being provided on a first channel located downstream of a meeting portion where the first channel and a third channel meet, the second on-off valve being provided on a second channel, the first channel being configured such that the hydrogen-containing gas discharged from the hydrogen generator and flowing through a fuel cell flows therethrough, the second channel being configured to branch from the first channel and bypass the fuel cell and being configured such that the hydrogen-containing gas is supplied therethrough to a combustor, the third channel being configured such that an oxidation gas flows therethrough, the oxidation gas being supplied to the first channel extending between the fuel cell and a branch portion from which the second channel branches, the combustor being configured to supply heat for the reforming reaction to the reformer; and (b) supplying an oxidation gas through the third channel to the first channel located downstream of the branch portion by activating an oxidation gas supply unit in step (a), the oxidation gas supply unit being provided on the third channel.

Advantageous Effects of Invention

According to the fuel cell system of the present invention and the method of operating the fuel cell system, the possibility that the channel clogging occurs by the condensed water generated from the hydrogen-containing gas having diffused and flowed into the fuel gas channel located downstream of the branch portion at the time of the start-up is made smaller than before.

DESCRIPTION OF EMBODIMENTS

Embodiment 1

Figure 1:
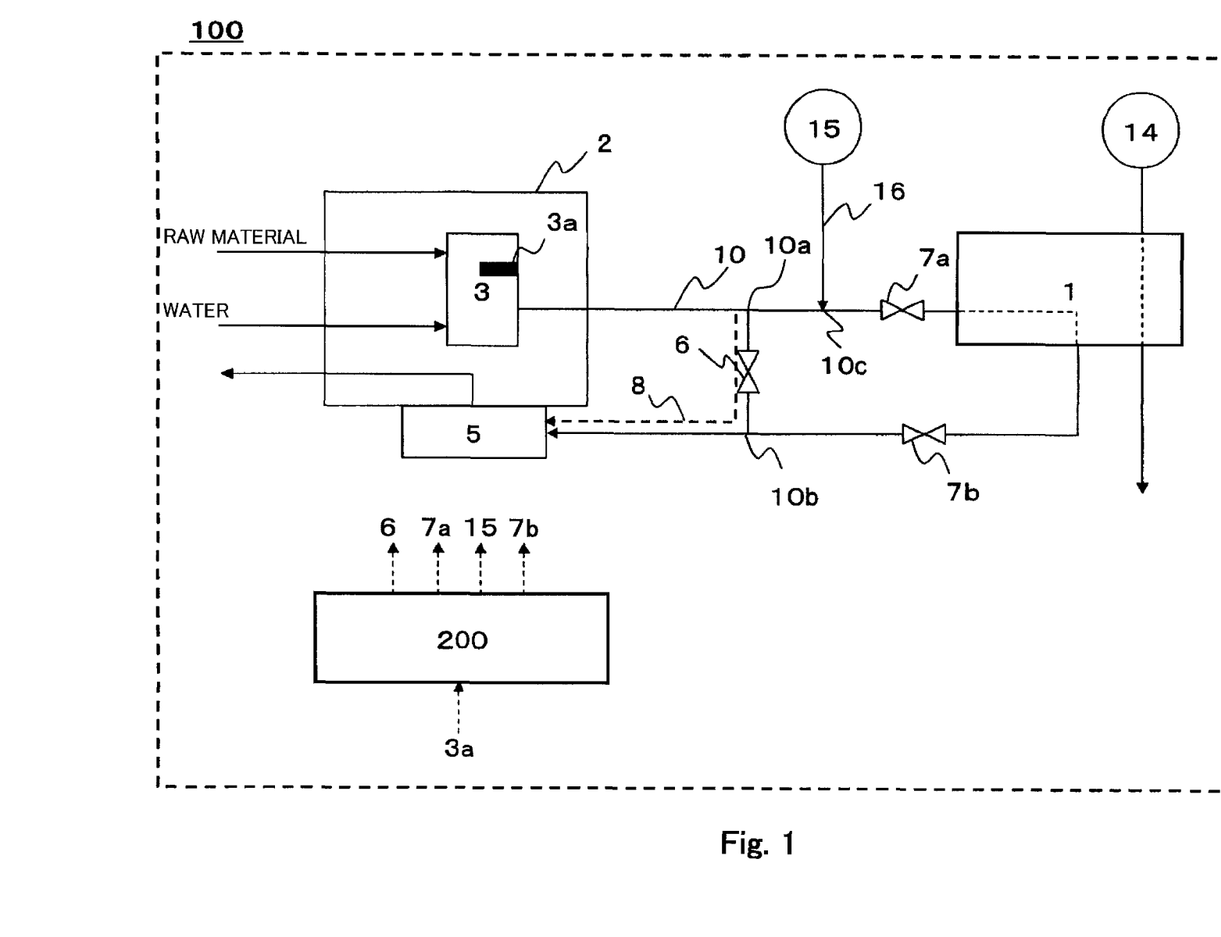
FIG. 1 is a diagram showing one example of the schematic configuration of a fuel cell system of Embodiment 1.

Hereinafter, a fuel cell system of Embodiment 1 will be explained in reference to the drawings. FIG. 1 is a diagram showing one example of the schematic configuration of the fuel cell system of Embodiment 1. In FIG. 1, a solid arrow shows a flow path of water, a material gas, an oxidation gas, or an oxidizing gas which flows when the fuel cell system operates. In FIG. 1, a dashed arrow shows a signal.

As shown in FIG. 1, a fuel cell system 100 of the present embodiment includes: a hydrogen generator 2 including a reformer 3 configured to generate a hydrogen-containing gas by a reforming reaction using a raw material; a combustor 5 configured to supply heat for the reforming reaction to the reformer 3; a fuel cell 1 configured to generate electric power using the hydrogen-containing gas supplied from the hydrogen generator 2; a first channel 10 through which the hydrogen-containing gas discharged from the hydrogen generator 2 and flowing through the fuel cell 1 flows; a second channel 8 which is configured to branch from the first channel 10 and bypass the fuel cell 1 and through which the hydrogen-containing gas is supplied to the combustor 5; a third channel 16 through which an oxidation gas supplied to the first channel 10 extending between a branch portion 10a and the fuel cell 1 flows; first on-off valves 7a and 7b provided on the first channel 10 located downstream of a meeting portion 10c where the first channel 10 and the third channel 16 meet; a second on-off valve 6 provided on the second channel 8; an oxidation gas supply unit 15 provided on the third channel 16; and a controller 200 configured to control the operations of respective devices constituting the fuel cell system 100.

The reformer 3 generates the hydrogen-containing gas by the reforming reaction on a reforming catalyst between the raw material supplied from a raw material supply unit (not shown) and steam supplied from an evaporator (not shown). Examples of the reforming catalyst are a Ni-based catalyst containing Ni as catalyst metal and a Ru-based catalyst containing Ru as catalyst metal. The evaporator evaporates water supplied from a water supply unit (not shown) to generate the steam and supplies the steam to the reformer 3. The reformer 3 includes a temperature detector 3a configured to detect the temperature of the reformer 3. Data of the temperature detected by the temperature detector 3a is fed back to the controller 200. The combustor 5 generates a high-temperature combustion gas by using as fuel the material gas or the hydrogen-containing gas generated by the reformer 3 and supplies the heat to the reformer 3 such that the temperature of the reformer 3 becomes a temperature suitable for the reforming reaction. The combustor 5 also supplies the heat to the evaporator for the generation of the steam. The fuel cell 1 generates electric power by the reaction between the hydrogen-containing gas generated as above and the oxidizing gas (for example, air) supplied from an oxidizing gas supply unit 14. One example of the oxidizing gas supply unit 14 is a blower.

The first channel 10 extends from the hydrogen generator 2 through the fuel cell 1 to the combustor 5. On the first channel 10, the first on-off valve 7a is provided between the branch portion 10a and the fuel cell 1, and the first on-off valve 7b is provided between the fuel cell 1 and a meeting portion 10b. The second channel 8 is a channel extending from the branch portion 10a of the first channel 10, bypassing the fuel cell 1, meeting the first channel 10 again at the meeting portion 10b, and extending to the combustor 5. To be specific, in the present embodiment, between the meeting portion 10b and the combustor 5, the second channel 8 and the first channel 10 utilize a common channel. The second on-off valve 6 is provided on the second channel 8 so as to be located between the branch portion 10a and the meeting portion 10b. However, the present embodiment is not limited to this example, and the second on-off valve 6 may be provided on any portion as long as it is provided on the second channel.

The oxidation gas supply unit 15 supplies the oxidation gas through the third channel 16 to the first channel 10 located between the branch portion 10a and the fuel cell 1. Here, the third channel 16 is configured to meet the first channel 10 located between the branch portion 10a and the first on-off valve 7a at the meeting portion 10c.

The controller 200 may be any device as long as it is configured to include a control function. The controller 200 includes a calculation processing portion (not shown) and a storage portion (not shown) configured to store a control program. Examples of the calculation processing portion are a MPU and a CPU. One example of the storage portion is a memory.

In the fuel cell system 100, the hydrogen generator 2 includes only the reformer 3 as a reactor related to the generation of the hydrogen-containing gas. However, the present embodiment is not limited to this example. For example, at least one of a shift converter (not shown) configured to reduce by a shift reaction carbon monoxide in the hydrogen-containing gas discharged from the reformer 3 and a CO remover (not shown) configured to reduce by at least one of an oxidation reaction and a methanation reaction the carbon monoxide in the hydrogen-containing gas discharged from the reformer 3 may be provided.

The controller 200 may be a single controller or a group of a plurality of controllers which cooperate to execute control operations of the fuel cell system.

The second channel 8 utilizes a part of the first channel 10 located downstream of the fuel cell 1. However, the present embodiment is not limited to this example. Instead of sharing the channel, the first channel 10 and the second channel 8 may be configured as separate channels.

Figure 2:
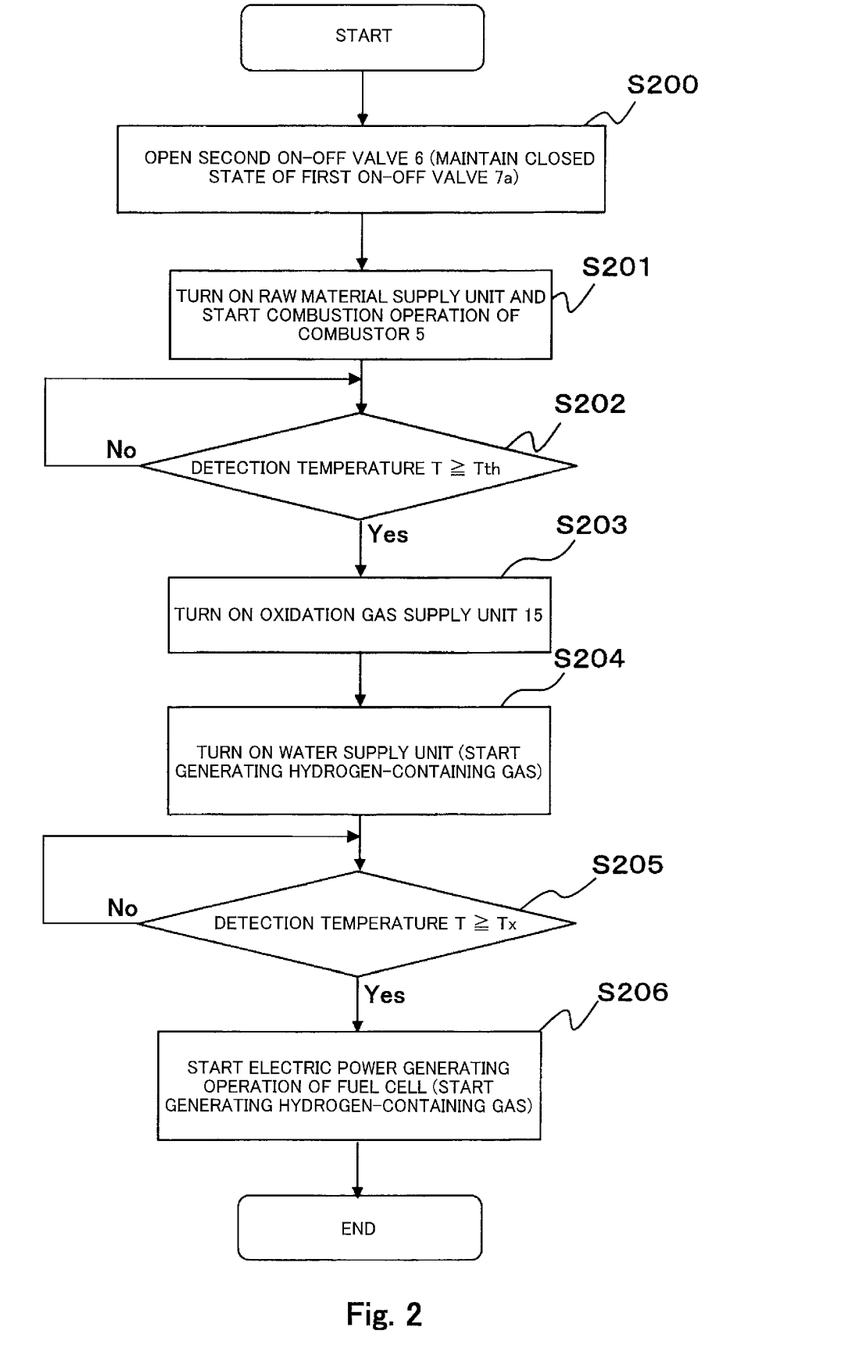
FIG. 2 is a diagram showing one example of an outline of an operation flow of the fuel cell system of Embodiment 1.

Next, an operation flow of the fuel cell system 100 of the present embodiment will be explained. FIG. 2 is a diagram showing one example of an outline of the operation flow of the fuel cell system of Embodiment 1.

At the time of the start-up of the fuel cell system 100, first, a temperature increasing operation of increasing the temperature of the hydrogen generator 2 is started such that the temperature of the hydrogen generator 2 becomes a temperature at which the hydrogen generator 2 can generate the hydrogen-containing gas. In the temperature increasing operation, the combustion of the combustor 5 is performed by the material gas having flowed through the hydrogen generator 2. Specifically, as shown in FIG. 2, when the fuel cell system 100 is started up, the second on-off valve 6 is opened while maintaining a closed state of the first on-off valve 7a closed by the controller 200 (Step S200).

Next, the operation of the raw material supply unit is started, and the supply of the raw material to the hydrogen generator 2 is started. The raw material discharged from the hydrogen generator 2 is supplied through the second channel 8 to the combustor 5, and the combustor 5 starts a combustion operation by using the raw material (Step S201).

At this time, the reforming reaction in the reformer 3 does not proceed, and the raw material is supplied as-is to the combustor 5. Then, the reformer 3 and the evaporator are heated by a flue gas discharged from the combustor 5 to be increased in temperature.

Next, after the temperature increasing operation of the hydrogen generator 2 is started, whether or not a detection temperature T of the temperature detector 3a configured to detect the temperature of the reformer 3 is a predetermined threshold temperature Tth (for example, 300° C.) or higher is determined (Step S202).

When the detection temperature T is a first threshold temperature Tth or higher (Yes in Step S202), the controller 200 starts the operation of the oxidation gas supply unit 15. Thus, the supply of the oxidation gas through the third channel 16 to the first channel 10 located downstream of the branch portion 10a is started (Step S203).

After the supply of the oxidation gas to the first channel 10 is started, the controller 200 starts the operation of the water supply unit. Thus, the supply of the water to the evaporator is started, and the generation of the hydrogen-containing gas in the reformer 3 is started (Step S204).

After the generation of the hydrogen gas is started, whether or not the detection temperature T of the temperature detector 3a has reached a second threshold temperature Tx (for example, 650° C.) is determined (Step S205). When the detection temperature T is the second threshold temperature Tx or higher, the controller 200 opens the first on-off valves 7a and 7b and closes the second on-off valve 6 and starts the supply of the hydrogen-containing gas discharged from the hydrogen generator 2 to the fuel cell 1. Thus, the electric power generating operation of the fuel cell system 100 is started (Step S206). The start-up of the fuel cell system is terminated by the shift to the electric power generating operation of the fuel cell system 100 in Step S206.

As described above, in the fuel cell system of the present embodiment, when the first on-off valve 7a is closed and the second on-off valve 6 is opened and the hydrogen-containing gas is discharged from the hydrogen generator 2 at the time of the start-up of the fuel cell system 100, the controller 200 activates the oxidation gas supply unit 15 to supply the oxidation gas through the third channel 16 to the first channel 10 located downstream of the branch portion 10a. With this, a possibility that the channel clogging occurs by the condensed water generated from the hydrogen-containing gas having diffused and flowed into the first channel 10 located downstream of the branch portion 10a at the time of the start-up of the fuel cell system is made smaller than before.

The predetermined first threshold temperature Tth is set as a threshold temperature which determines that the temperature of the reformer 3 is a temperature at which the reforming reaction can proceed and the temperature of the evaporator is a temperature at which the water can be evaporated. The second threshold temperature Tx is a temperature at which the hydrogen-containing gas can be supplied from the hydrogen generator 2 to the fuel cell 1 in the electric power generating operation of the fuel cell system. In addition, the second threshold temperature Tx is set as a temperature higher than the first threshold temperature Tth. The first threshold temperature Tth and the second threshold temperature Tx are suitably set depending on the configuration and size of the fuel cell system 100, and the like.

In the above control flow, the oxidation gas is supplied from the oxidation gas supply unit 15 to the first channel 10 before the generation of the hydrogen-containing gas is started. This is because the possibility that the hydrogen-containing gas diffuses and flows into the first channel 10 located downstream of the branch portion 10a is made smaller than a case where the operation of the oxidation gas supply unit 15 is started after the generation of the hydrogen-containing gas in the hydrogen generator 2 is started. However, the timing of the start of the operation of the oxidation gas supply unit 15 is not limited to this example. The start of the operation of the oxidation gas supply unit 15 may be after or at the same time as the start of the generation of the hydrogen-containing gas in the hydrogen generator 2. In this case, in a time period in which the oxidation gas supply unit 15 is not operating during the generation of the hydrogen-containing gas, there is the possibility that the hydrogen-containing gas flows into the first channel 10 located downstream of the branch portion 10a and the condensed water is generated. However, even if the condensed water is generated, the condensed water is discharged to the second channel 8 by the flow of the oxidation gas supplied to the first channel 10 by the subsequent operation of the oxidation gas supply unit 15. Thus, the channel clogging of the first channel 10 located downstream of the branch portion 10a is suppressed compared to conventional fuel cell systems.

In a period in which the hydrogen-containing gas discharged from the hydrogen generator 2 is flowing through the second channel 8 at the time of the start-up, the oxidation gas supply unit 15 may be controlled to continuously supply the oxidation gas to the first channel 10 or to intermittently supply the oxidation gas to the first channel 10. In a case where the oxidation gas supply unit 15 is intermittently operated, there is the possibility that the hydrogen-containing gas flows into the first channel 10 located downstream of the branch portion 10a and the condensed water is generated in a period in which the oxidation gas supply unit 15 is not operated. However, even if the condensed water is generated, the condensed water is discharged to the second channel 8 by the oxidation gas supplied to the first channel 10 at the time of the start of the next operation. Thus, the channel clogging of the first channel 10 located downstream of the branch portion is suppressed compared to the conventional fuel cell systems.

In the above operation flow, an open-close operation of the first on-off valve 7b when the first on-off valve 7a is being closed was not explained. However, the first on-off valve 7b may be opened or closed. Instead of closing the first on-off valve 7a in the above operation flow, the first on-off valve 7b may be controlled to be closed, and the first on-off valve 7a may be controlled to be opened. Moreover, only one of the first on-off valve 7a and the first on-off valve 7b may be provided, and the on-off valve may be controlled to be closed. To be specific, the "first on-off valve" closed when a destination to which the hydrogen-containing gas generated by the hydrogen generator 2 flows is controlled to be not the fuel cell 1 but the second channel 8 may be any on-off valve as long as it is an on-off valve provided on the first channel 10 located downstream of the meeting portion 10c.

Moreover, in the fuel cell system of the above embodiment, an on-off valve may be provided on the third channel 16. In Step S203 of the above operation flow, this on-off valve may be opened, and the operation of the oxidation gas supply unit 15 may be started.

MODIFICATION EXAMPLE

Next, Modification Example of the fuel cell system of Embodiment 1 will be explained. Since the fuel cell system of Modification Example is the same in configuration as that of Embodiment 1, an explanation thereof is omitted. Regarding the operation flow at the time of the start-up, the fuel cell system of Modification Example is the same as that of Embodiment 1. However, the fuel cell system of Modification Example is characterized in that even after the shift to the electric power generating operation after the start-up of the fuel cell system 100, the oxidation gas supply unit 15 is operated, and the oxidation gas is added through the third channel 16 to the hydrogen-containing gas supplied to the fuel cell 1.

This operation is commonly called air bleed, and this suppresses the decrease in the electric power generation performance, the decrease being caused by the adsorption of the carbon monoxide to the anode of the fuel cell at the time of the electric power generating operation. According to Modification Example, both the effect of suppressing the channel clogging caused by the condensed water in the first channel 10 located downstream of the branch portion 10a explained in Embodiment 1 and the effect of suppressing the decrease in the electric power generation performance can be obtained by using one oxidation gas supply mechanism (the oxidation gas supply unit 15 and the third channel 16), the decrease being caused by the adsorption of the carbon monoxide to the anode of the fuel cell at the time of the electric power generating operation.

The supply of the oxidation gas from the oxidation gas supply unit 15 at the time of the electric power generating operation may be continuously executed or may be intermittently executed during the electric power generating operation.

Embodiment 2

Figure 3:
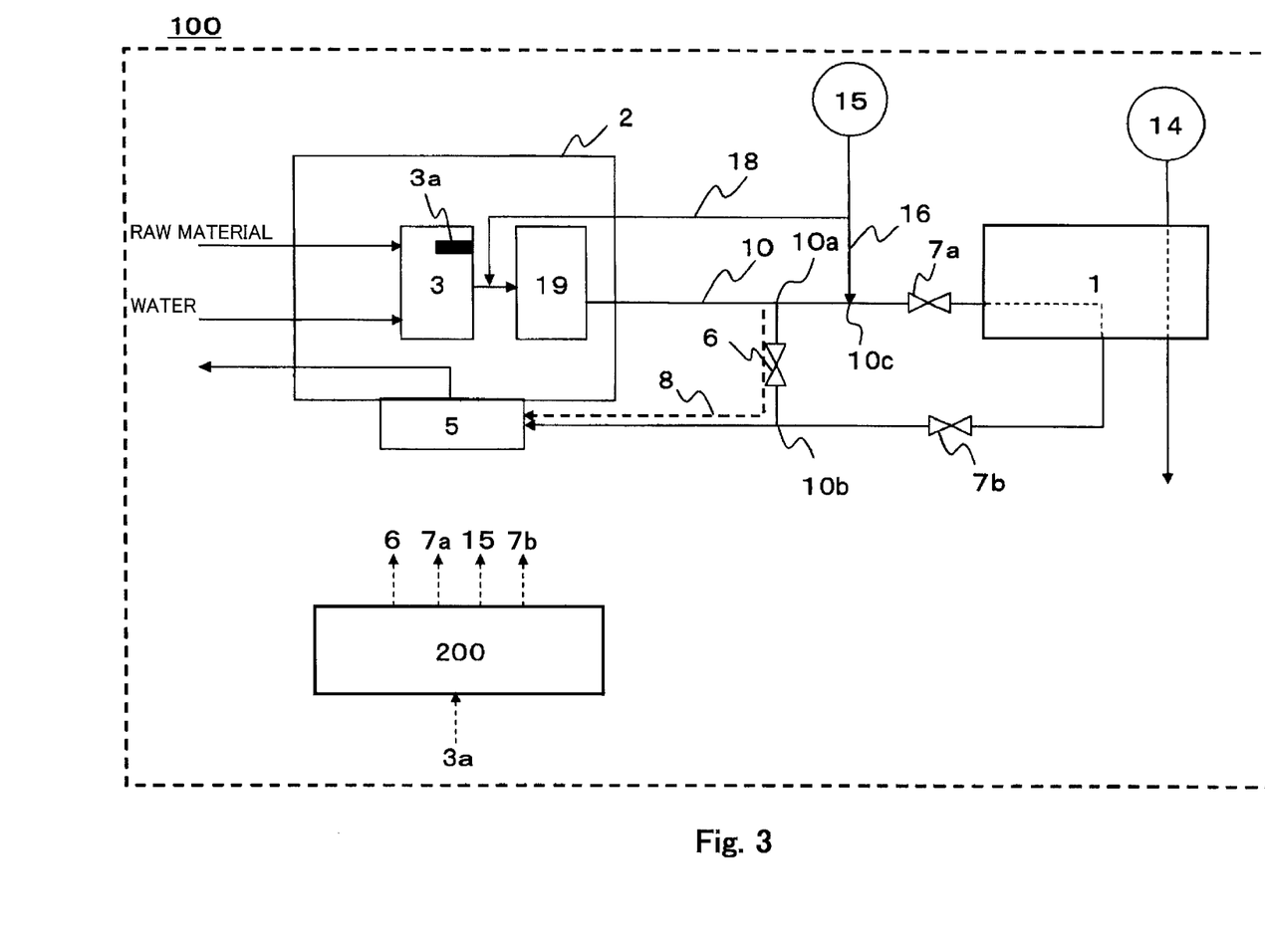
FIG. 3 is a diagram showing one example of the schematic configuration of the fuel cell system of Embodiment 2.

Next, the fuel cell system of Embodiment 2 will be explained. FIG. 3 is a diagram showing one example of the schematic configuration of the fuel cell system of Embodiment 2. In FIG. 3, the same reference signs are used for the same components as in the schematic diagram of FIG. 1 according to Embodiment 1, and explanations thereof are omitted.

As shown in FIG. 3, the fuel cell system of the present embodiment is substantially the same in configuration as the fuel cell system of Embodiment 1. However, the fuel cell system of the present embodiment is different from the fuel cell system of Embodiment 1 in that a CO remover 19 configured to reduce by the oxidation reaction the carbon monoxide in the hydrogen-containing gas generated by the reformer 3 and a fourth channel 18 which branches from the third channel 16 and through which the oxidation gas supplied to the CO remover 19 flows are provided in the hydrogen generator 2.

The CO remover 19 reduces by the oxidation reaction the carbon monoxide in the hydrogen-containing gas generated by the reformer 3 in the hydrogen generator 2. Specifically, the CO remover 19 reduces the carbon monoxide by adding the oxidation gas to the supplied hydrogen-containing gas and changing the carbon monoxide into carbon dioxide by the oxidation reaction.

The fourth channel 18 branches from the third channel 16 and communicates with the CO remover 19. The oxidation gas supply unit 15 supplies the oxidation gas through the fourth channel 18 to the CO remover 19. To be specific, the oxidation gas discharged from the oxidation gas supply unit 15 is divided to flow through both the third channel 16 and the fourth channel 18.

With this, both the function of supplying the oxidation gas to the CO remover 19 at the time of the start-up and the function of supplying the oxidation gas to the first channel 10 located downstream of the branch portion 10a at the time of the start-up are achieved, and this is preferable.

In the fuel cell system of the present embodiment, the oxidation gas supply unit 15 may be operated not only at the time of the start-up but also at the time of the electric power generating operation, and the supply of the oxidation gas to the CO remover 19 and the supply (air bleed) of the oxidation gas to the hydrogen-containing gas supplied to the fuel cell 1 may be executed.

With this, both the effect of reducing the carbon monoxide in the hydrogen-containing gas in the electric power generating operation and the effect of suppressing the decrease in the electric power generation performance can be obtained by using one oxidation gas supply unit 15, the decrease being caused by the adsorption of the carbon monoxide to the anode of the fuel cell.

It is preferable that the flow rate of the supplied oxidation gas be set in accordance with the amount of hydrogen-containing gas generated by the reformer 3. This is because the amount of carbon monoxide contained in the hydrogen-containing gas varies in proportion to the amount of hydrogen-containing gas generated by the reformer 3. Specifically, the amount of oxidation gas supplied is increased if the amount of raw material supplied to the reformer 3 increases, and the amount of oxidation gas supplied is decreased if the amount of raw material supplied to the reformer 3 decreases.

Modification Example 1

Figure 4:
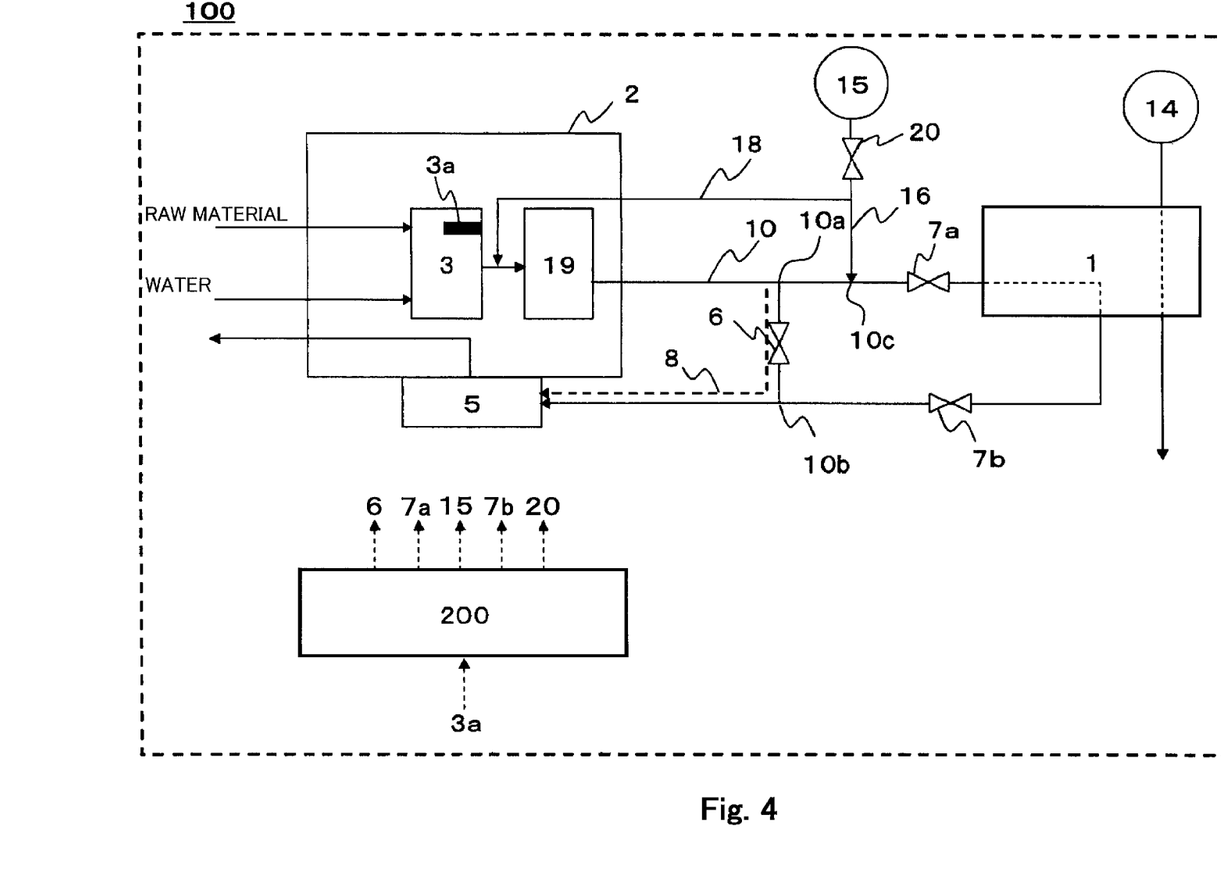
FIG. 4 is a diagram showing one example of the schematic configuration of the fuel cell system of Modification Example 1 of Embodiment 2.

Next, Modification Example 1 of the fuel cell system of Embodiment 2 will be explained. FIG. 4 is a diagram showing one example of the schematic configuration of the fuel cell system of Modification Example 1. As shown in FIG. 4, the fuel cell system of Modification Example 1 is characterized in that: a third on-off valve 20 is provided on the third channel 16 located upstream of a branch portion from which the fourth channel 18 branches; and by opening the third on-off valve 20, the third channel 16 and the fourth channel 18 are set to an open state. When supplying the oxidation gas from the oxidation gas supply unit 15, the third on-off valve 20 is opened.

Modification Example 2

Figure 5A:
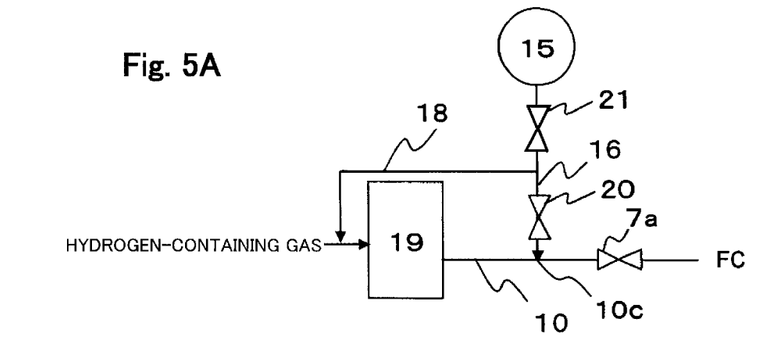
FIGS. 5A to 5C are diagrams each showing one example of an outline of a configuration that is a feature of the fuel cell system of Modification Example 2 of Embodiment 2.
Figure 5B:
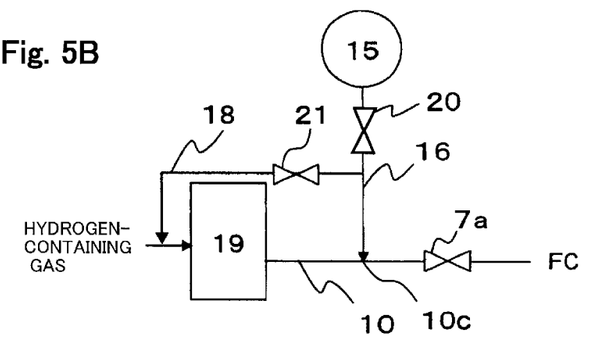
Figure 5C:
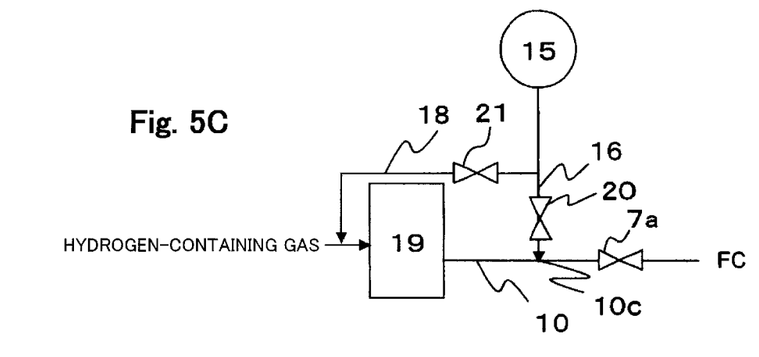

Next, Modification Example 2 of the fuel cell system of Embodiment 2 will be explained. FIGS. 5A to 5C are diagrams each showing one example of an outline of a characteristic configuration of the fuel cell system of Modification Example 2. Unlike the fuel cell system of Modification Example 1, the fuel cell system of Modification Example 2 is characterized by including the third on-off valve 20 configured to open and close the third channel 16 and a fourth on-off valve 21 configured to open and close the fourth channel 18. Specific configurations of the third on-off valve 20 and the fourth on-off valve 21 are shown in FIGS. 5A to 5C.

In FIG. 5A, the third on-off valve 20 is provided on the third channel 16 so as to be located downstream (the first channel 10 side) of the branch portion from which the fourth channel 18 branches. The fourth on-off valve 21 is provided on the third channel 16 so as to be located upstream (the oxidation gas supply unit 15 side) of the branch portion from which the fourth channel 18 branches. In the case of supplying the oxidation gas to both the third channel 16 and the fourth channel 18, both the third on-off valve 20 and the fourth on-off valve 21 are opened. In the case of supplying the oxidation gas to only the fourth channel 18, the third on-off valve 20 is closed, and the fourth on-off valve 21 is opened.

In FIG. 5B, the third on-off valve 20 is provided on the third channel 16 so as to be located upstream (the oxidation gas supply unit 15 side) of the branch portion from which the fourth channel 18 branches. The fourth on-off valve 21 is provided on the fourth channel 18. In the case of supplying the oxidation gas to both the third channel 16 and the fourth channel 18, both the third on-off valve 20 and the fourth on-off valve 21 are opened. In the case of supplying the oxidation gas to only the third channel 16, the third on-off valve 20 is opened, and the fourth on-off valve 21 is closed.

In FIG. 5C, the third on-off valve 20 is provided on the third channel 16 so as to be located downstream (the first channel 10 side) of the branch portion from which the fourth channel 18 branches. The fourth on-off valve 21 is provided on the fourth channel 18. In the case of supplying the oxidation gas to both the third channel 16 and the fourth channel 18, both the third on-off valve 20 and the fourth on-off valve 21 are opened. In the case of supplying the oxidation gas to only the third channel 16, the third on-off valve 20 is opened, and the fourth on-off valve 21 is closed. In the case of supplying the oxidation gas to only the fourth channel 18, the third on-off valve 20 is closed, and the fourth on-off valve 21 is opened.

As above, the number of on-off valves provided on the third channel 16 and the fourth channel in Modification Example 2 is larger than that in Modification Example 1. However, Modification Example 2 is more preferable than Modification Example 1 in that by independently controlling the open-close operations of the third on-off valve 20 and the fourth on-off valve 21 by the controller 200, the supply and supply stop of the oxidation gas in at least one of the third channel 16 and the fourth channel can be controlled.

Modification Example 3

Figure 6:
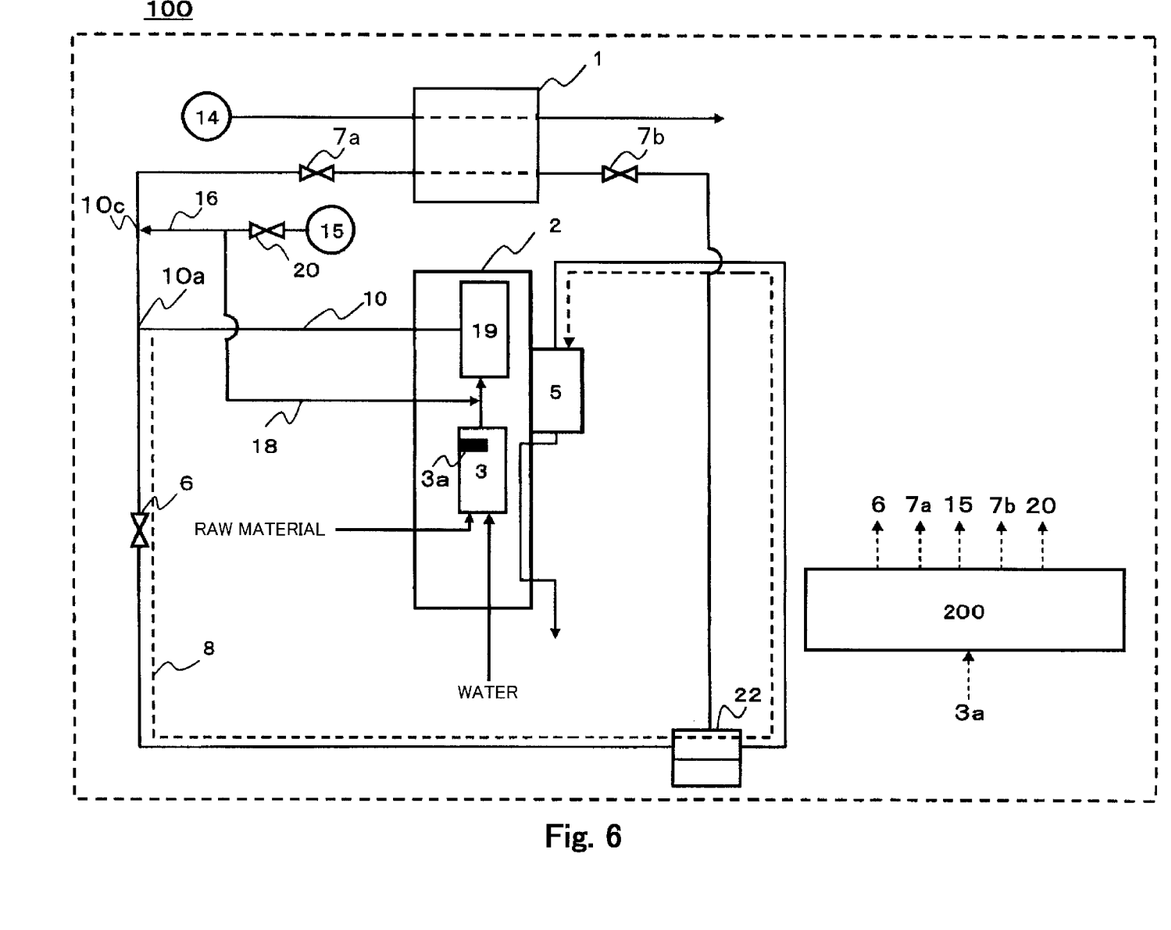
FIG. 6 is a diagram showing one example of the schematic configuration of the fuel cell system of Modification Example 3 of Embodiment 2.

Next, Modification Example 3 of the fuel cell system of Embodiment 2 will be explained. FIG. 6 is a diagram showing one example of the schematic configuration of the fuel cell system of Modification Example 3. As shown in FIG. 6, as with Modification Example 1, the fuel cell system of Modification Example 3 is configured such that: the third on-off valve 20 is provided on the third channel 16 so as to be located upstream of the branch portion from which the fourth channel 18 branches; and the third channel 16 and the fourth channel 18 are set to an open state by opening the third on-off valve 20. In addition, the fuel cell 1 is located higher than the hydrogen generator 2. Therefore, a hydrogen-containing gas entrance of the fuel cell is located higher than a hydrogen-containing gas exit of the hydrogen generator. More specifically, the fuel cell system of Modification Example 3 is different from the fuel cell systems of Embodiment 2 and other Modification Examples in that the first channel 10 located downstream of the branch portion 10a from which the second channel 8 branches is inclined upward from the branch portion 10a. In a case where the first channel 10 located downstream of the branch portion 10a is inclined upward as described above and if the hydrogen-containing gas discharged from the hydrogen generator 2 diffuses and flows into the first channel 10 located downstream of the branch portion 10a at the time of the start-up and the condensed water is generated, the condensed water may flow backward into the high-temperature CO remover 19, and this may cause bumping. If the bumping occurs, the flow rate of the hydrogen-containing gas flowing to the combustor 5 may significantly fluctuate, and flame-off or incomplete combustion may occur in the combustor 5.

Here, as with the fuel cell system of Modification Example 1, the fuel cell system of Modification Example 3 opens the third on-off valve and activates the oxidation gas supply unit 15 when the hydrogen generator 2 is generating the hydrogen-containing gas in a state where the first channel 10 located downstream of the branch portion 10a is closed and the second channel is opened at the time of the start-up. With this, the channel clogging of the first channel 10 by the condensed water is suppressed, and the decrease in combustion stability of the combustor 5 by the bumping of the condensed water having flowed backward to the CO remover 19 is suppressed.

In Modification Example 3, a gas-liquid separator 22 is provided on the second channel 8, and the second channel 8 extending from the branch portion 10a to the gas-liquid separator 22 is inclined downward. This is to prevent the condensed water generated in the second channel 8 from flowing backward to the CO remover 19 and to discharge the condensed water to the gas-liquid separator 22.

Modification Example 4

Figure 7:
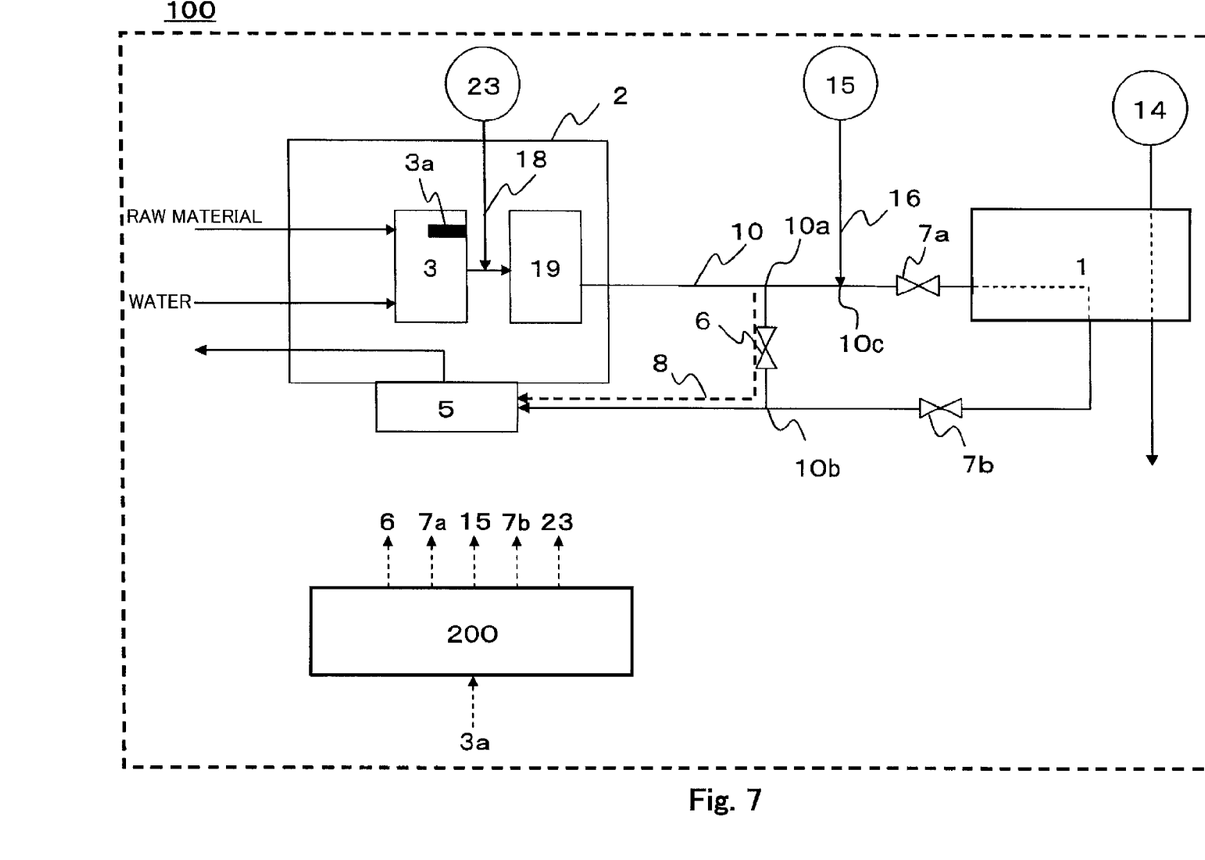
FIG. 7 is a diagram showing one example of the schematic configuration of the fuel cell system of Modification Example 4 of Embodiment 2.

The fuel cell system of Modification Example 4 is configured such that in the fuel cell system according to any one of Embodiment 2 and Modification Examples 1 to 3, the third channel and the fourth channel do not share a common channel and are separately provided, and an oxidation gas supply unit configured to supply the oxidation gas for the air bleed and an oxidation gas supply unit configured to supply the oxidation gas for the oxidation reaction of the CO remover 19 are separately provided.

Other than the above features, the fuel cell system of Modification Example 4 may be the same in configuration as the fuel cell system according to any one of Embodiment 2 and Modification Examples 1 to 3.

Next, details of the fuel cell system 100 of Modification Example 4 will be explained.

FIG. 7 is a diagram showing one example of the schematic configuration of the fuel cell system 100 of Modification Example 4.

As shown in FIG. 7, the fuel cell system 100 of Modification Example 4 is configured such that: the third channel 16 and the fourth channel 18 are independently provided; and the oxidation gas supply unit 15 configured to supply the oxidation gas for the air bleed and an oxidation gas supply unit 23 configured to supply the oxidation gas for the oxidation reaction of the CO remover 19 are included in the fuel cell system 100 of Modification Example 4.

INDUSTRIAL APPLICABILITY

According to the fuel cell system of the present invention, the possibility that the channel clogging occurs by the condensed water generated from the hydrogen-containing gas having flowed into the fuel gas channel located downstream of the branch portion at the time of the start-up is made smaller than before. Therefore, the present invention is useful as fuel cell systems and the like.

REFERENCE SIGNS LIST 100, 700 fuel cell system
1 fuel cell
2 hydrogen generator
3 reformer
3a temperature detector
5 combustor
6 second on-off valve
7a, 7b first on-off valve
8 second channel
10 first channel
10a branch portion
10b, 10c meeting portion
14 oxidizing gas supply unit
15 oxidation gas supply unit
16 third channel
18 fourth channel
19 CO remover
20 third on-off valve
21 fourth on-off valve
22 gas-liquid separator
200 controller

The invention claimed is:

1. A fuel cell system comprising:
a hydrogen generator including a reformer configured to generate a hydrogen-containing gas by a reforming reaction using a raw material and steam;
a combustor configured to supply heat for the reforming reaction to the reformer;
a fuel cell configured to generate electric power by using the hydrogen-containing gas supplied from the hydrogen generator;
a first channel through which the hydrogen-containing gas discharged from the hydrogen generator and flowing through the fuel cell flows;
a second channel which is configured to branch from the first channel and bypass the fuel cell and through which the hydrogen-containing gas supplied to the combustor flows;
a third channel through which an oxidation gas flows, the oxidation gas being supplied to the first channel extending between the fuel cell and a branch portion from which the second channel branches;
a first on-off valve provided on the first channel located downstream of a meeting portion where the first channel and the third channel meet;
a second on-off valve provided on the second channel;
an oxidation gas supply unit provided on the third channel; and
a controller configured such that when the first on-off valve is closed and the second on-off valve is opened, and the hydrogen-containing gas is discharged from the hydrogen generator at the time of start-up, the controller activates the oxidation gas supply unit to supply the oxidation gas through the third channel to the first channel located downstream of the branch portion.

2. The fuel cell system according to claim 1, wherein at the time of an electric power generating operation, the controller supplies the oxidation gas from the oxidation gas supply unit through the third channel to the hydrogen-containing gas supplied to the fuel cell.

3. The fuel cell system according to claim 1, wherein
the hydrogen generator includes: a CO remover configured to reduce by an oxidation reaction carbon monoxide contained in the hydrogen-containing gas discharged from the reformer; and a fourth channel which is configured to branch from the third channel and through which the oxidation gas supplied to the CO remover flows, and
the controller is configured such that when the first on-off valve is closed and the second on-off valve is opened, and the hydrogen-containing gas is discharged from the hydrogen generator at the time of the start-up, the controller causes the oxidation gas, discharged from the oxidation gas supply unit, to flow through both the third channel and the fourth channel.

4. The fuel cell system according to claim 3, further comprising a third on-off valve provided on the third channel located upstream of a branch portion from which the fourth channel branches, wherein:
the third channel and the fourth channel are set to an open state by opening the third on-off valve; and
the controller is configured such that when the first on-off valve is closed and the second on-off valve is opened, and the hydrogen-containing gas is discharged from the hydrogen generator at the time of the start-up, the controller opens the third on-off valve and activates the oxidation gas supply unit to supply the oxidation gas to the third channel and the fourth channel.

5. The fuel cell system according to claim 3, further comprising:
a third on-off valve configured to open and close the third channel; and
a fourth on-off valve configured to open and close the fourth channel, wherein
the controller is configured such that when the first on-off valve is closed and the second on-off valve is opened, and the hydrogen-containing gas is discharged from the hydrogen generator at the time of the start-up, the controller opens the third on-off valve and the fourth on-off valve and activates the oxidation gas supply unit to supply the oxidation gas to the third channel and the fourth channel.

6. The fuel cell system according to claim 1, wherein a hydrogen-containing gas entrance of the fuel cell is located higher than a hydrogen-containing gas exit of the hydrogen generator.

7. The fuel cell system according to claim 6, wherein the first channel located downstream of the branch portion from which the second channel branches is inclined upward.

8. A method of operating a fuel cell system, comprising the steps of:
(a) discharging a hydrogen-containing gas from a hydrogen generator at the time of start-up in a state where a first on-off valve is closed and a second on-off valve is opened, the hydrogen generator including a reformer configured to generate the hydrogen-containing gas by a reforming reaction using a raw material and steam, the first on-off valve being provided on a first channel located downstream of a meeting portion where the first channel and a third channel meet, the second on-off valve being provided on a second channel, the first channel being configured such that the hydrogen-containing gas discharged from the hydrogen generator and flowing through a fuel cell flows therethrough, the second channel being configured to branch from the first channel and bypass the fuel cell and being configured such that the hydrogen-containing gas is supplied therethrough to a combustor, the third channel being configured such that an oxidation gas flows therethrough, the oxidation gas being supplied to the first channel extending between the fuel cell and a branch portion from which the second channel branches, the combustor being configured to supply heat for the reforming reaction to the reformer; and
(b) supplying an oxidation gas through the third channel to the first channel located downstream of the branch portion by activating an oxidation gas supply unit in step (a), the oxidation gas supply unit being provided on the third channel.

* * * * *